Patented July 17, 1923.

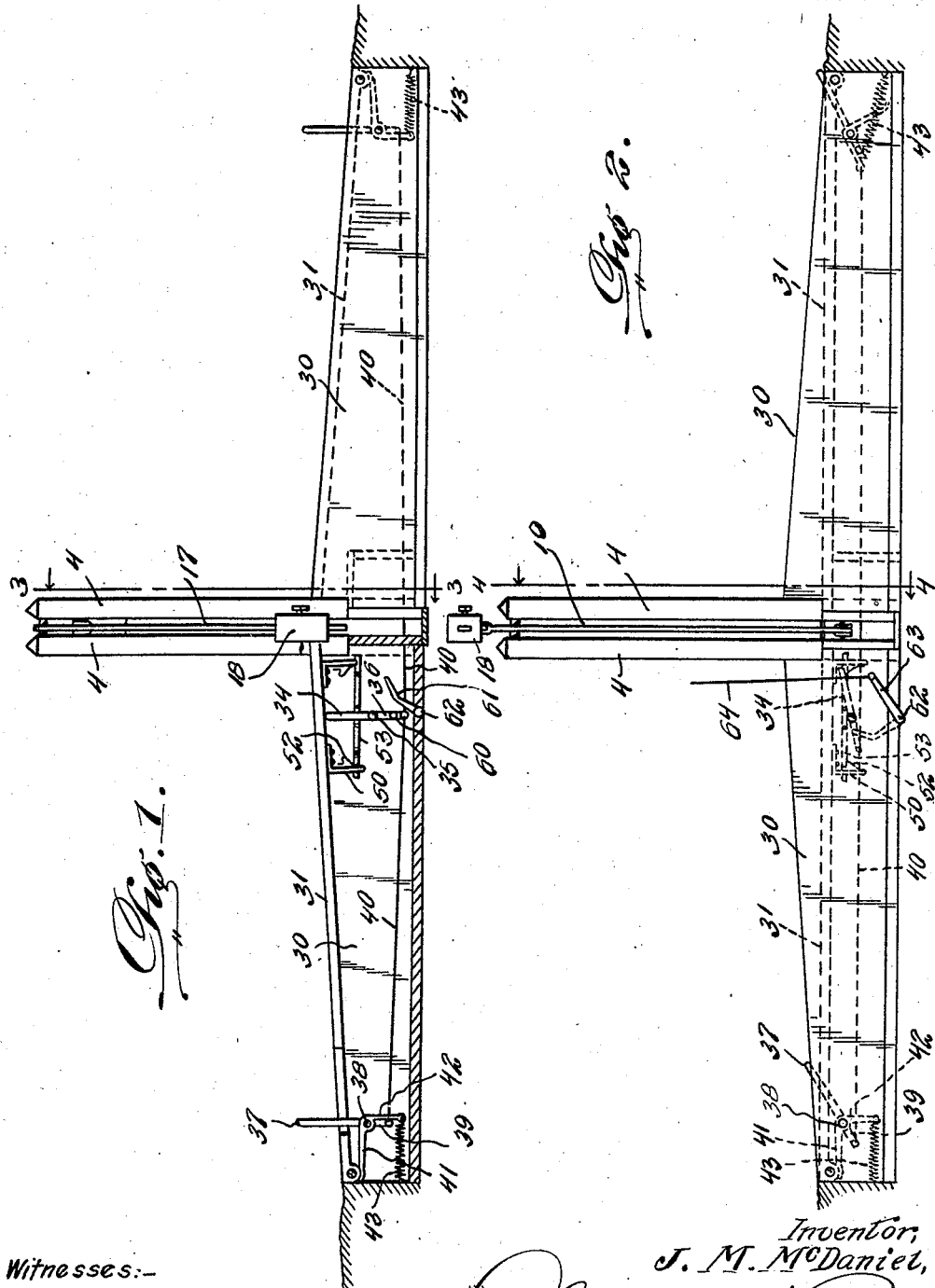

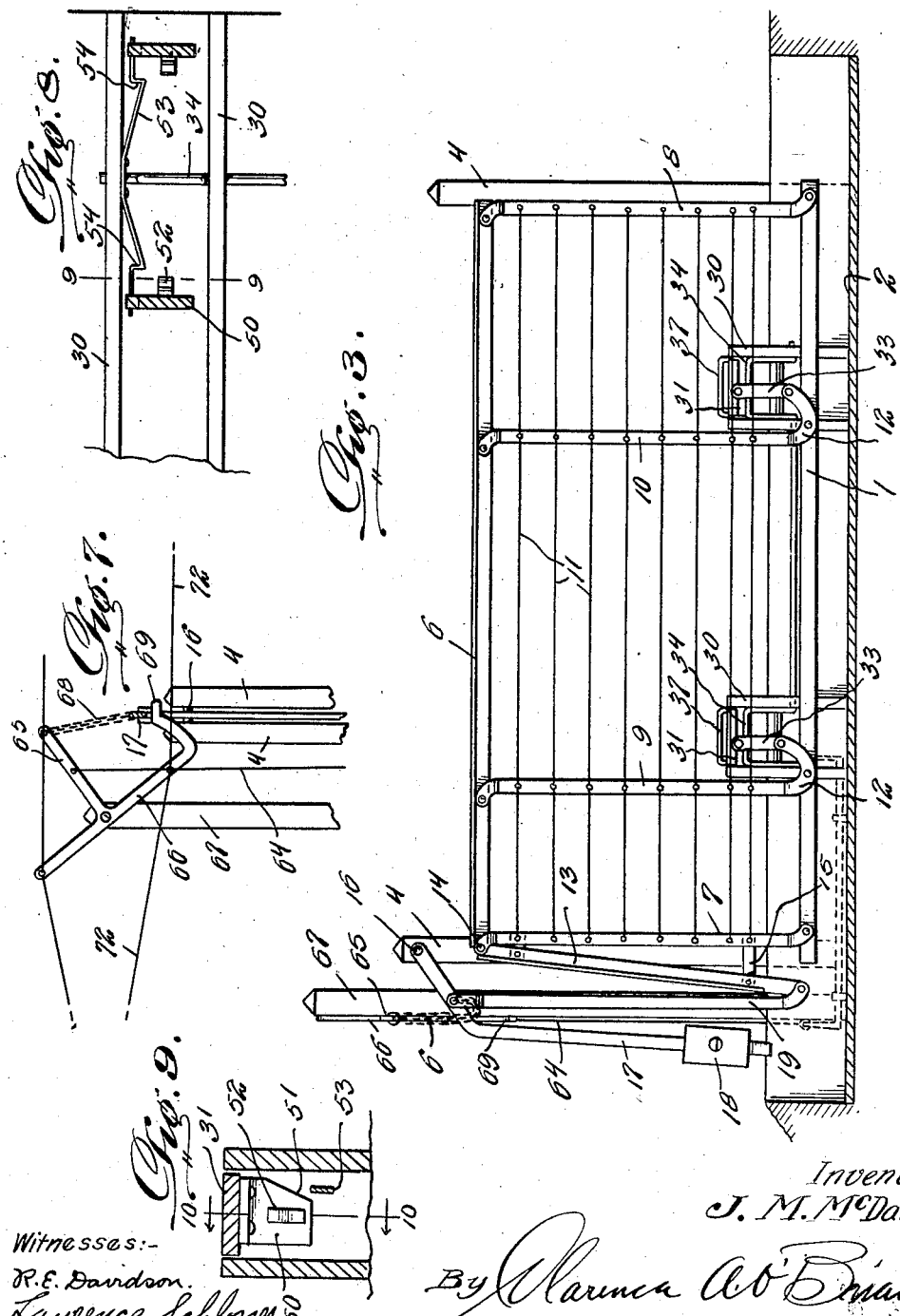

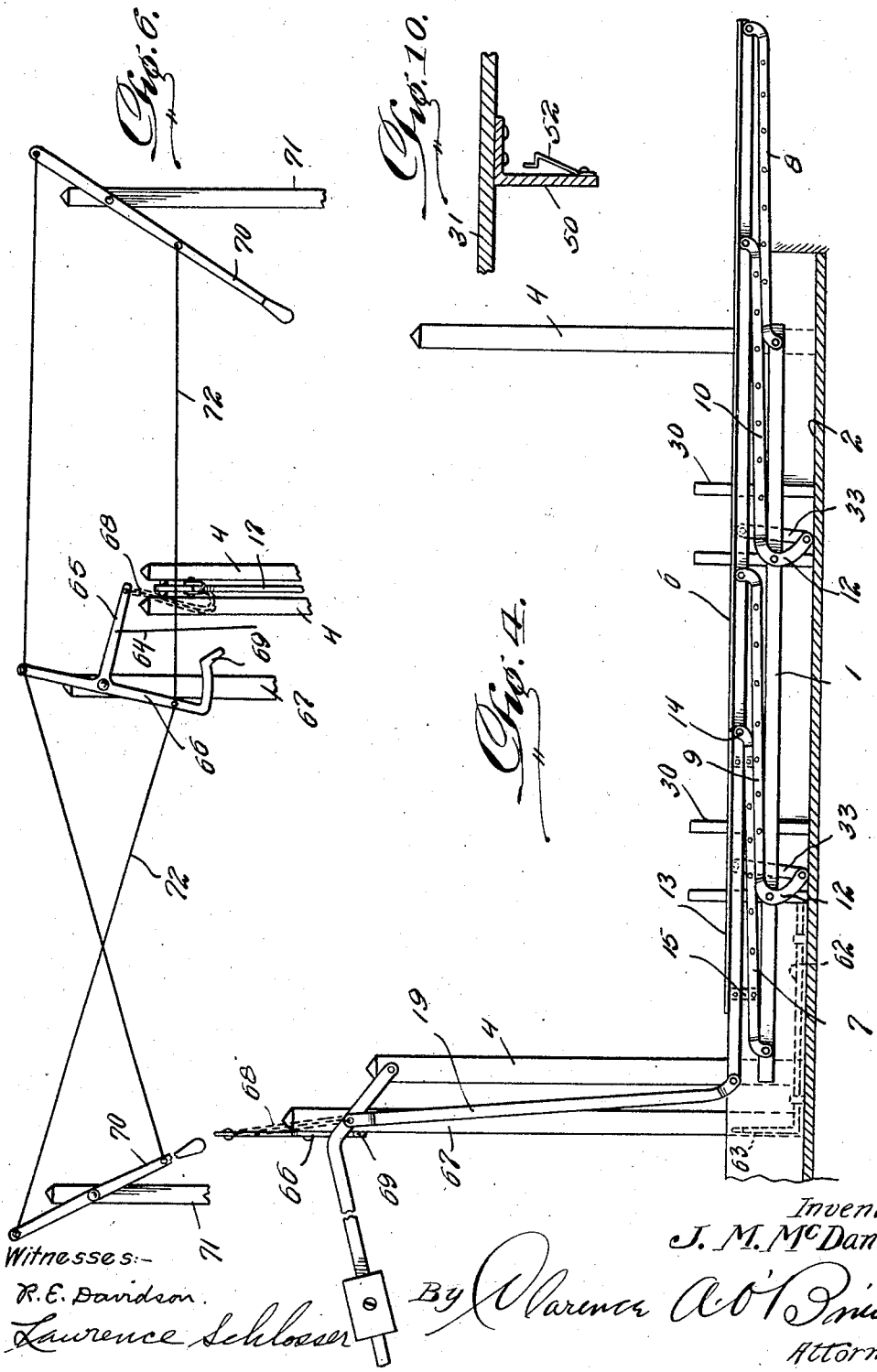

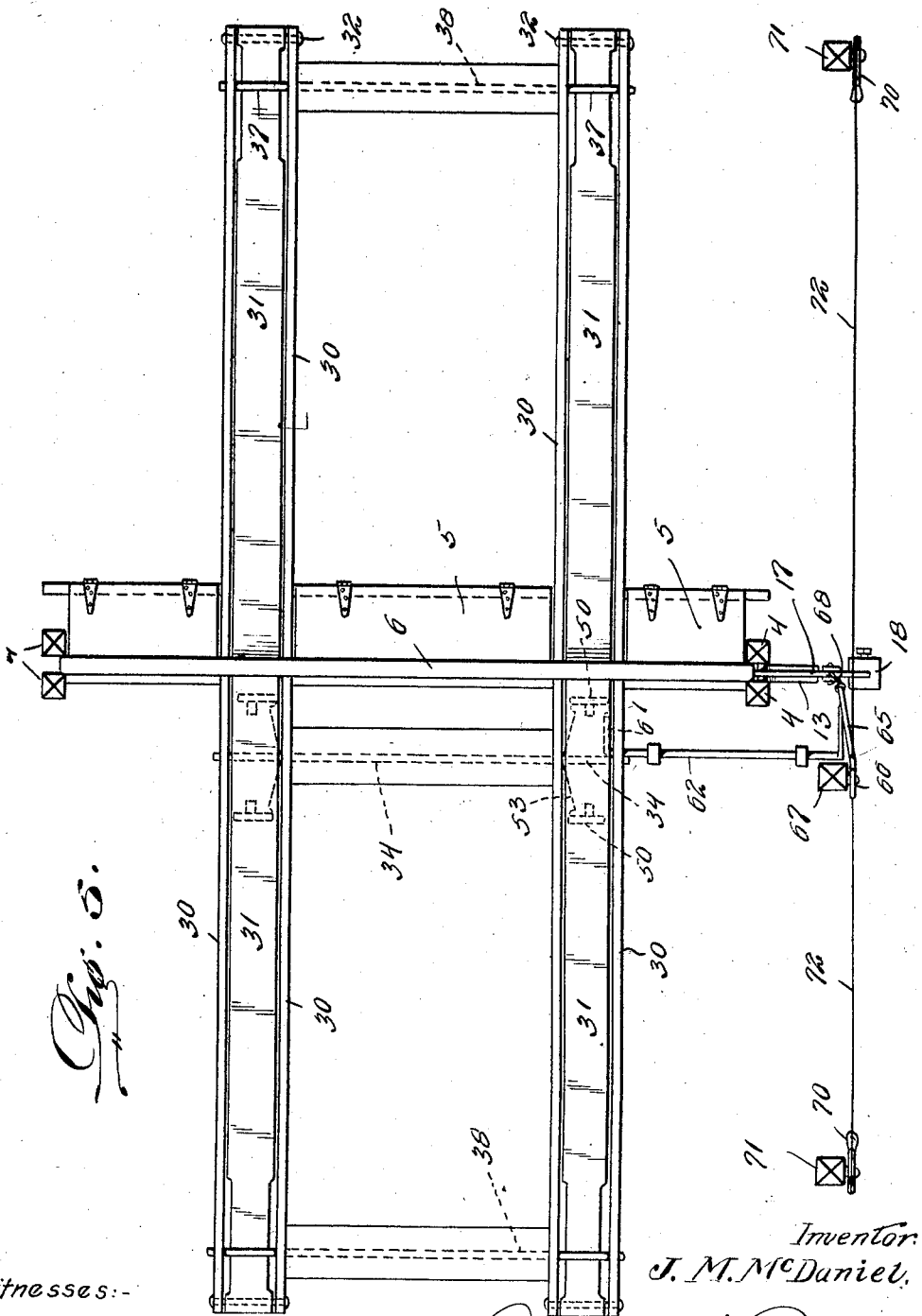

1,462,066

UNITED STATES PATENT OFFICE.

JAMES M. McDANIEL, OF AMARILLO, TEXAS.

GATE.

Application filed October 11, 1921. Serial No. 506,948.

*To all whom it may concern:*

Be it known that I, JAMES M. MCDANIEL, a citizen of the United States, residing at Amarillo, in the county of Potter and State of Texas, have invented new and useful Improvements in Gates, of which the following is a specification.

The object of my said invention is the provision of a simple, strong and durable gate in combination with means through the medium of which the gate may be opened and closed before and after passage through the gate-way.

To the attainment of the foregoing, the invention consists in the improvement as hereinafter described and definitely claimed.

In the accompanying drawings, forming part of this specification:—

Figure 1 is a view, partly in elevation and partly in section, showing the gate as closed.

Figure 2 is an elevation from the same view point showing the gate open.

Figure 3 is a vertical section, taken in the plane indicated by the line 3—3 of Figure 1.

Figure 4 is a vertical section on the line 4—4 of Figure 2.

Figure 5 is a top plan view showing the novel gate construction.

Figures 6 and 7 are perspectives of equipment that has to do with the control of the gate by horsemen.

Figure 8 is an enlarged detail horizontal section of the mechanism for preventing the lever 34 from being raised to vertical position through the springs 43 until after a vehicle has passed off of one pair of wheel levers and through the gate way.

Figure 9 is a vertical cross-section on the line 9—9 of Figure 8.

Figure 10 is a detail vertical section on line 10—10 of Figure 9 and showing one of the pendent tappets and the hook thereon.

Similar numerals of reference designate corresponding parts in all of the views of the drawings.

By comparison of Figures 1 to 4 it will be noted that a fixed bar 1 is located in a trough 2 below the gate-way designated by 3 in Figure 4 and between posts 4 best shown in Figure 5. Also as best shown in Figure 5 hinged doors 5 are provided above one side of the trough 2 so as to afford ready access to the mechanism in the trough for repair or replacement purposes.

The gate proper of my improvement comprises a crown bar 6, of T-form in cross-section, adapted in its lower position, Figure 4, to close the major portion of the top of the trough 2, end links 7 and 8 interposed between and pivotally connected to the fixed bar 1 and the crown bar 6, intermediate links 9 and 10 pivotally connected to the crown bar 6, and appropriate spaced runners 11 connected to and carried by the said links. At the lower ends of the links 9 and 10 are bifurcated portions 12; and it will also be noted that an extension bar 13 of T-form in cross-section, is pivotally connected at 14 to the bar 6 and the link 7. Said bar 13 is fixed to the adjacent link 7 by an interposed brace 15, Figures 3 and 4. pivotally connected at 16 between one pair of the posts 4 is one end of a lever 17, weighted at 18 and connected through a link 19 with the forward end of the bar 13. Manifestly the gate constructed in the manner described may be opened or collapsed against the action of the weight 18, Figures 3 and 4, the weight being raised incident to the opening or collapsing operation. It will also be observed that in their lowermost positions the crown bar 6 and the extension bar 13 form a safe and solid covering over the trough 2.

A portion of my invention resides in the provision of means whereby a wheeled vehicle is enabled to open or collapse the gate against the action of the weight 18, to bring about the fastening of the gate in open or collapsed state for the safe passage of the vehicle through the gate-way, and to bring about the release of the gate after the vehicle has passed through the gate-way 3 so as to enable the weight 18 by the gravitation thereof to raise or close the gate—i. e., restore the same to the position shown in Figure 3. The said means comprises troughs 30 in parallelism and at right angles to the trough 2. wheel-levers 31 pivoted at their outer ends, as indicated at 32, and having their inner ends arranged above the trough 2, links 33 connecting the arms of the bifurcations 12 and the inner ends of the wheel-levers 31, bail-shaped levers 34, fulcrumed at 35, Figure 1, and movable vertically below the inner portions of the wheel-levers 31 at one side of the trough 2, said levers 34 having arms 36, Figure 1, bail-shaped control levers 37 straddling the outer end portions of the wheel-levers 31 and connected in pairs by bars 38 and having arms 39, cables 40 connecting said arms 39 and the arms 36 on the bail levers 34, bell crank levers 41, fulcrumed at 38 and having arms 42 arranged at the inner sides of the arms 39, and retractile springs 43 interposed between the arms 42 and the ends of the troughs 30. It will be noted here that the wheels of a vehicle moving toward the right in Figure 1 will run on the outer ends of the adjacent wheel levers 31 and will rock the adjacent bail-shaped levers 37, as shown by dotted lines in Figure 2, thereby putting the remote springs 43 under tension and at the same time rocking the bail-shaped lever 34 (see dotted lines in Figure 2) so as to permit of depression of the mentioned wheel-levers 31. Then as the forward wheels of the vehicle move on the levers 31 toward the trough 2, the weight of the vehicle depresses said levers, with the result that the gate is collapsed and opened as shown in Figures 2 and 4. After the vehicle passes through the gate-way 3, over the open or collapsed gate, and then passes over and off of the other wheel-levers 31, the gravitation of the weight 18 operates through the connections described to raise and close the gate. Manifestly the bail-shaped control levers 37 are not likely to be actuated by cattle, and hence the gate cannot be opened by cattle, which is obviously an important advantage.

In order to prevent the levers 34 from being raised to vertical position through the springs 43 until after a vehicle has passed off of one pair of wheel-levers 31 and through the gate-way 3. I provide the mechanism best shown in Figures 1, 2, 8, 9 and 10. The said mechanism comprises pendent tappets 50 on the inner portions of one pair of wheel-levers 31, said tappets being beveled at 51, hooks 52 on the opposed faces of said tappets 50, and springs 53 on the walls of troughs 30 and having shoulders 54. Following the rocking of the bail-shaped levers 34 to the position shown by dotted lines in Figure 2, said levers 34 will be engaged and held in depressed position by abutments 54 of springs 53. Then when the inner portions of the said levers 31 are further depressed, hooks 52 will assume positions below the bail-shaped levers 34, and then after the beveled edges 51 of the tappets 50 have pressed the spring shoulders 54 out of engagement with the bail-shaped levers 34, hooks 52 on upward movement of the wheel levers 31, as when a vehicle passes off the same, will start the movement of the bail-shaped levers 34 toward the position shown in Figure 1, in which position the apparatus will be in readiness for another operation.

On the arm 36 of the lever 34, Figure 1, is a lateral projection 60 for the engagement of an arm 61 on a rock-shaft 62, Figures 1, 2 and 4. The said rock shaft 62 is provided with another arm 63, and this arm 63 is connected by a cable 64 with the arm 65 of a lever 66, Figures 6 and 7, fulcrumed on an auxiliary post 67. The arm 65 is connected by a cable or chain 68 with the weight lever 17. It will also be noted that the lever 66 is provided with an arm 69 adapted to assume a position below the weight lever 17 so as to hold the gate in its collapsed and open position. Associated with the lever 66 are levers 70 on posts 71, which levers 70 are connected by cables 72 with the lever 66 so that a horseman in approaching the gate is enabled to open the gate and pass through the gate-way, and is then enabled to bring about closing of the gate.

It will be apparent from the foregoing that no manual effort is necessary when the gate is opened by a wheeled vehicle, but that when the gate is opened by a horseman, manual operation of one lever 70 is necessary for the opening of the gate, and afterward manual operation of the other lever 70 is necessary in order to release the weight lever 17 and to enable the gravitation of the weight to raise and close the gate.

Having described my invention, what I claim and desire to secure by Letters-Patent, is:—

1. The combination of a collapsible gate, a weighted lever to close and yieldingly maintain the gate in closed position, a trough below the gate, troughs in parallelism arranged at opposite sides of and at right angles to the first-named trough, wheel levers pivoted at their outer ends in the second-named troughs and having their inner ends arranged above the first-named trough, means connecting the inner ends of the wheel levers and the gate, bail-shaped levers movable vertically below the inner portions of the wheel levers at one side of the first-named trough, said levers having arms, bail-shaped control levers straddling the outer end portions of the wheel levers and having arms, cables connecting the arms of said control levers and the arms of the first-named bail-shaped levers, bell-crank levers having arms arranged at the inner sides of the arms of the control levers, retractile springs interposed between the arms of the bell-crank levers and the ends of the second-named troughs, pendent tappets on the inner portions of one pair of wheel-levers, said tappets being beveled and being provided at their opposed faces with hooks adapted to assume positions below the first-named bail-shaped levers, and springs on the walls of the troughs and having shoulders adapted to engage the first-named bail-shaped levers and detachably hold the same in depressed position, said shoulders being released from said levers by the beveled portions of the tappets.

2. The combination of a collapsible gate, a weighted lever to close and yieldingly maintain the gate in closed position, wheel-levers connected with the gate, movable means to lock the wheel-levers against depression, control levers wheel-actuated and connected with said locking means, spring-actuated levers complementary to the control levers, with manually operated levers to enable a horseman to bring about opening of the gate, said levers being connected with an intermediate lever, and the intermediate lever being connected with the locking means and being provided with an arm to engage and maintain the weighted lever in raised position.

In testimony whereof, I affix my signature.

JAMES M. McDANIEL.